US012692176B2

(12) United States Patent
Imahashi et al.

(10) Patent No.: US 12,692,176 B2
(45) Date of Patent: Jul. 28, 2026

(54) WATER TREATMENT SYSTEM AND WATER TREATMENT METHOD

(71) Applicant: WOTA CORP., Tokyo (JP)

(72) Inventors: Kageto Imahashi, Kamakura (JP); Isao Ishida, Kamakura (JP)

(73) Assignee: WOTA CORP., Tokyo (JP)

( * ) Notice: Subject to any disclaimer, the term of this patent is extended or adjusted under 35 U.S.C. 154(b) by 794 days.

(21) Appl. No.: 17/637,198

(22) PCT Filed: Jul. 13, 2020

(86) PCT No.: PCT/JP2020/027202
§ 371 (c)(1),
(2) Date: May 20, 2022

(87) PCT Pub. No.: WO2021/039159
PCT Pub. Date: Mar. 4, 2021

(65) Prior Publication Data
US 2022/0274848 A1 Sep. 1, 2022

(30) Foreign Application Priority Data
Aug. 23, 2019 (JP) ................................. 2019-152591

(51) Int. Cl.
C02F 1/00 (2023.01)
E03B 7/07 (2006.01)
C02F 103/00 (2006.01)

(52) U.S. Cl.
CPC .............. C02F 1/008 (2013.01); E03B 7/074 (2013.01); C02F 2103/002 (2013.01);
(Continued)

(58) Field of Classification Search
CPC ................ C02F 1/008; C02F 2103/002; C02F 2103/005; C02F 2209/006; C02F 2209/40; C02F 2301/046; E03B 7/074
See application file for complete search history.

(56) References Cited

U.S. PATENT DOCUMENTS 6,106,716 A 8/2000 Berkman
2005/0016910 A1* 1/2005 Plante ................. A47L 15/4291
210/194

(Continued)

FOREIGN PATENT DOCUMENTS

CN 1251080 A 4/2000
JP 0819773 A 1/1996
(Continued)

OTHER PUBLICATIONS

International Search Report of PCT/JP2020/027202 mailed Aug. 18, 2020, 5 pages.
(Continued)

*Primary Examiner* — Liam Royce
(74) *Attorney, Agent, or Firm* — BROOKS KUSHMAN P.C.

(57) ABSTRACT

The present disclosure aims to move water between a plurality of devices and create a cycle for reusing treated water generated by each device. A water treatment system includes a plurality of wastewater treatment machines provided for each source; a plurality of sensors that at least detect and output the water volume and water quality of treated water; tanks that store treated water as recirculation water; an excess water tank/storage tank that store excess water; and a control device that drive-controls the wastewater treatment machines and manages the water volume and water quality of treatment water in each source tank on the basis of sensor data from the sensors. The control device controls replenish shortages by using recirculation water from another source or excess water from an excess water tank, if a determination has been made that there is a shortage of recirculation water in one source, using sensor data.

7 Claims, 6 Drawing Sheets

(52) U.S. Cl.
CPC .. *C02F 2103/005* (2013.01); *C02F 2209/006*
(2013.01); *C02F 2209/40* (2013.01); *C02F*
*2301/046* (2013.01)

(56) References Cited

U.S. PATENT DOCUMENTS

| | | | |
|---|---|---|---|
| 2010/0043129 A1 | 2/2010 | Platteel et al. | |
| 2018/0354811 A1* | 12/2018 | Vielma .................. | C02F 1/008 |
| 2019/0031530 A1* | 1/2019 | Kitagawa ............... | C02F 1/283 |
| 2020/0256041 A1 | 8/2020 | Kitagawa et al. | |
| 2021/0309539 A1* | 10/2021 | Budampati ............. | H04L 67/30 |

FOREIGN PATENT DOCUMENTS

| | | | | |
|---|---|---|---|---|
| JP | H1057941 | A | 3/1998 | |
| JP | H11188363 | A | 7/1999 | |
| JP | 2003071432 | A | 3/2003 | |
| JP | 2003313917 | A | 11/2003 | |
| JP | 2005163411 | A | 6/2005 | |
| JP | 2010517775 | A | 5/2010 | |
| JP | 2011036840 | A | 2/2011 | |
| JP | 2012217975 | A | 11/2012 | |
| WO | WO-2017155124 | A1 * | 9/2017 | ............. C02F 1/001 |
| WO | 2019059309 | A1 | 9/2020 | |

OTHER PUBLICATIONS

Extended European Search Report of European patent application
No. 20858032.4 dated Nov. 28, 2022, 8 pages.

* cited by examiner

| DATE/TIME | WATER AMOUNT | WATER QUALITY |
|---|---|---|
| 2019. 08. 02  00:00 | 50 | A |
| 2019. 08. 02  01:00 | 60 | A |
| . . . . | . . . . | . . . . |

| TIME PERIOD | PRIORITY ORDER 1 | PRIORITY ORDER 1 | . . . | PRIORITY ORDER N |
|---|---|---|---|---|
| 0:00 ～ 6:00 | TOILET SYSTEM | COOKING SYSTEM | . . . | . . . |
| 6:00 ～ 12:00 | EXCESS WATER TANK | TOILET SYSTEM | . . . | . . . |
| . . . | . . . | . . . | . . . | . . . |

FIG.6

WATER TREATMENT SYSTEM AND WATER TREATMENT METHOD

CROSS-REFERENCE TO RELATED APPLICATIONS

This application is the U.S. national phase of PCT Application No. PCT/JP2020/027202 filed on Jul. 13, 2020, which claims priority to Japanese Patent Application No. 2019-152591, filed Aug. 23, 2019, the disclosures of which are hereby incorporated in their entireties by reference herein.

TECHNICAL FIELD

The present disclosure relates to a technique of treating and reusing wastewater, and of bringing about circulation for the reuse of usage water between plural equipment relating to a toilet system, a cooking system, a laundry system, a shower system and the like.

BACKGROUND ART

There have conventionally been proposed systems for reusing wastewater and the like that aim to conserve water by, for example, reusing wastewater or the like of clean water that is used in a general household or the like, as rinse water for a flushing toilet or the like.

For example, Patent Document 1 discloses a wastewater reusing system in which a starting end of a flow path for reuse is connected so as to communicate, and a water intake port is provided at the final end of that flow path for reuse, and that has, at the flow path for reuse, a selecting means for detecting the turbidity of raw water and selecting re-used water or non-reused water in accordance with the detected turbidity.

Moreover, Patent Document 2 discloses a wastewater treatment method including a step of supplying water to a reservoir of a wastewater device, a step of collecting supplied water within the reservoir, a step of guiding water from the reservoir to a reservoir that consumes at least one type of water, a step of observing the water quality, and a step of, if the water quality is lower than a permitted level, discharging the water to a sewer drain pipe from the reservoir of the wastewater device and/or the reservoir of the water consuming section.

PRIOR ART DOCUMENTS

Patent Documents

Patent Document 1: Japanese Patent Application Laid-Open (JP-A) No. H08-19773 Patent Document 2: Japanese Patent Application National Publication No. 2010-517775

SUMMARY

Technical Problem

However, Patent Documents 1 and 2 do not in any way disclose or suggest the point of carrying out exchange of usage water between plural generating sources such as, for example, a toilet system, a cooking system, a laundry system, a shower system and the like, and bringing about circulation for reusing wastewater generated at the respective generating sources.

The present disclosure was made in view of the above-described problem, and an object thereof is to carry out exchange of water between plural generating sources such as, for example, a toilet system, a cooking system, a laundry system, a shower system and the like, and bring about circulation for reusing treated waters that are generated at the respective devices.

Solution to Problem

In order to solve the above-described problem, a water treatment system relating to a first aspect of the present disclosure is a water treatment system that treats sewage from each generating source of generating sources that include at least any of a toilet system, a cooking system, a laundry system or a shower system, and stores treated waters as circulation/usage waters, the system comprising: a plurality of sewage treating machines provided for the generating sources respectively; a plurality of sensors that are provided for the generating sources respectively, and that at least detect and output water amounts and water qualities of treated waters of the sewage treating machines; tanks that are provided for the generating sources respectively, and that store the treated waters as circulation/usage waters; an excess water tank that stores excess water generated at the tanks; and a control device that controls driving of the sewage treating machines, and that, based on sensor data from the sensors, manages water amounts and water qualities of the treated waters of the tanks of the respective generating sources, wherein, in a case in which the control device judges, based on the sensor data, that insufficiency in a circulation/usage water of one of the generating sources has arisen, the control device effects control so as to replenish an insufficient amount by circulation/usage water of another generating source or excess water of the excess water tank.

A water treatment method relating to a second aspect of the present disclosure is a water treatment method that treats sewage from each generating source of generating sources that include at least any of a toilet system, a cooking system, a laundry system or a shower system, and stores treated waters as circulation/usage waters, wherein: sewage treating machines treat sewage from each generating source, and sensors at least detect and output water amounts and water qualities of treated waters of the sewage treating machines, and tanks store the treated waters as circulation/usage waters; an excess water tank stores excess water generated at the tanks; a control device controls driving of the sewage treating machines, and, based on sensor data from the sensors, manages water amounts and water qualities of the treated waters of the tanks of the respective generating sources, and, in a case of judging, based on the sensor data, that insufficiency in a circulation/usage water of one of the generating sources has arisen, replenishes an insufficient amount by circulation/usage water of another generating source or excess water of the excess water tank.

Advantageous Effects of Invention

In accordance with the present disclosure, there can be provided a technique that carries out exchange of water between plural devices such as, for example, a toilet system, a cooking system, a laundry system, a shower system and the like, and that brings about circulation for reusing treated waters that are generated at the respective devices.

BRIEF DESCRIPTION OF DRAWINGS

Figure 6:
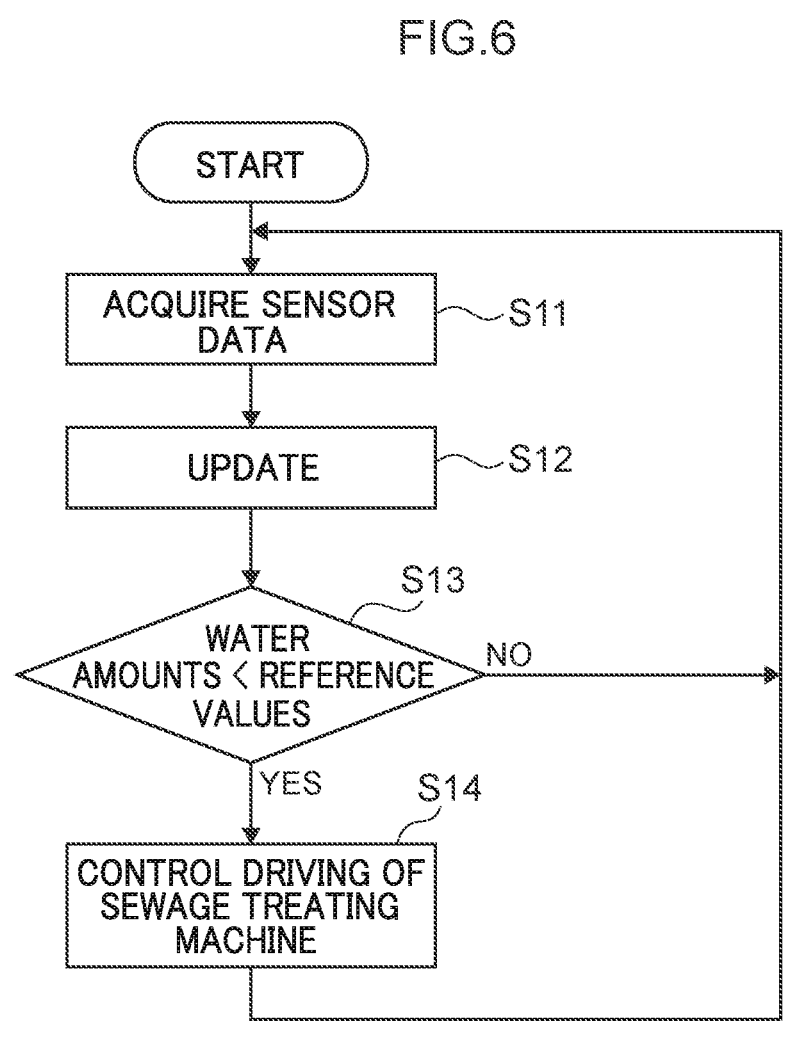

FIG. 6 is a flowchart that explains details of other treatment processes relating to water amount adjustment by the water treatment system relating to the first embodiment of the present disclosure.

DESCRIPTION OF EMBODIMENTS

Embodiments of the present disclosure are described hereinafter with reference to the drawings.

First Embodiment

Figure 1:
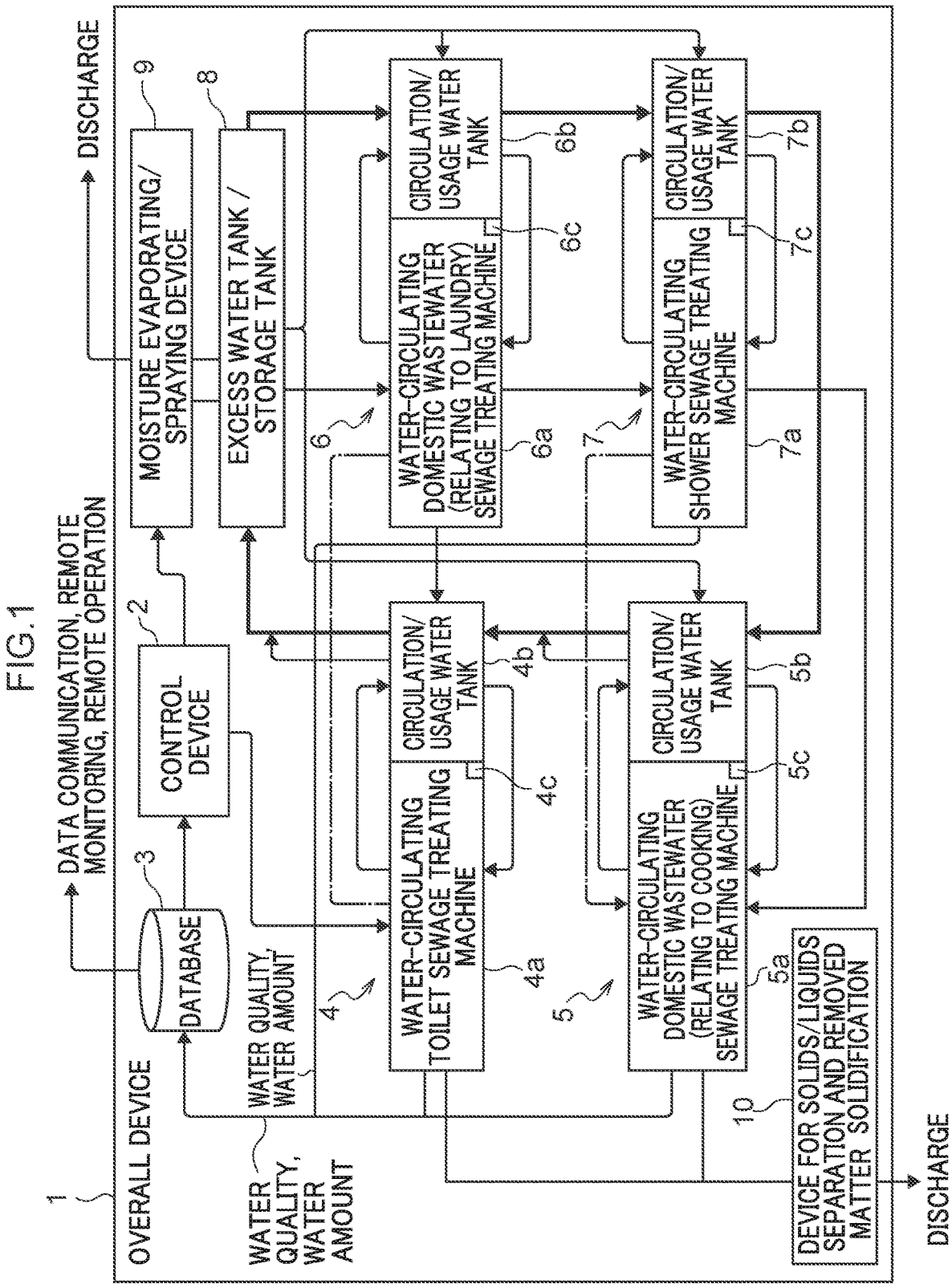
FIG. 1 is a structural drawing of a water treatment system relating to a first embodiment of the present disclosure.

The structure of a water treatment system relating to a first embodiment of the present disclosure is illustrated and described in FIG. 1.

As illustrated in this drawing, a present water treatment system 1 has a control device 2 that governs overall control, and this control device 2 has a database 3 integrally or as a separate body. Further, the present water treatment system 1 has at least any of a toilet system treating device 4, a cooking system treating device 5, a laundry system treating device 6 and a shower system treating device 7, from each generating source of the generating sources.

The toilet system treating device 4 has a water-circulating toilet sewage treating machine 4a and a circulation/usage water tank 4b, and a sensor 4c also is included in the water-circulating toilet sewage treating machine 4a. The cooking system treating device 5 has a water-circulating domestic wastewater sewage treating machine 5a and a circulation/usage water tank 5b, and a sensor 5c also is included in the water-circulating domestic wastewater sewage treating machine 5a.

The laundry system treating device 6 has a water-circulating domestic wastewater sewage treating machine 6a and a circulation/usage water tank 6b, and a sensor 6c also is included in the circulation/usage water tank 6b. Further, the shower system treating device 7 has a water-circulating shower sewage treating machine 7a and a circulation/usage water tank 7b, and a sensor 7c also is included in the water-circulating shower sewage treating machine 7a.

In this way, the circulation/usage water tanks 4b, 5b, 6b, 7b that store water that is circulated are annexed to the sewage treating machines 4a, 5a, 6a, 7a that the respective devices 4 through 7 have, and tanks of scales that match the needed amounts of water can be provided. Treatment is carried out such that the water qualities obtained by treatment at the equipment are the same level, or, in accordance with the treatment level, water can be transferred over at the point in time of reaching the water quality level needed at the device to which water is to be distributed, even in the midst of treatment.

Sterility is required of drinking water and toilet washing water, but other than this, there are differences in the requisite standards thereof such as BOD, color, odor and the like. Therefore, in cases in which water is needed immediately such as at times of an emergency or the like, handling such as the exchange of water or the like is possible. Germs, viruses and impurities that affect the human body such as bacteria and the like are not included in the treated water of the respective devices 4 through 7. In the treatment processes, a single one or plural ones of various types of sterilization, disinfecting, added means (ultraviolet light, chlorine, ozone, boiling, membrane treatment, PH, hardness treatment and the like) can be freely combined.

The water treatment system 1 further has an excess water tank/storage tank 8. The circulation/usage water tanks 4b, 5b, 6b, 7b of the respective devices 4 through 7 are connected via water paths such that water can be exchanged therebetween, and are connected also to the excess water tank/storage tank 8 via water paths such that water can be exchanged therebetween.

Among the treated waters of the respective devices 4 through 7, for the water that is stored in the excess water tank/storage tank 8 as excess water, a treated state that is uniform can be ensured by making the treatment methods of the final treatments (e.g., filtering treatments or the like) of the respective treating machines 4a, 5a, 6a, 7a be the same, or by passing the waters through a predetermined treating device before the excess water tank.

In other words, the waters that are treated at the respective sewage treating machines 4a, 5a, 6a, 7a are treated waters that satisfy a uniform standard. In this case, for example, in the same, final treatment process within the sewage treating machines, by making the sensors 4c, 5c, 6c, 7c that are disposed thereat be the same, the water qualities of the treated waters can be maintained constant, and therefore, water of the same water quality can always be used.

Further, the waters can be maintained in hygienic states by setting unillustrated disinfecting devices, which are such that the stored waters do not spoil, at the circulation/usage water tanks 4b, 5b, 6b, 7b and the excess water tank/storage tank 8. Other than this, a preservation method such as freezing or the like is also possible.

The excess water tank/storage tank 8 is connected to a moisture evaporating/spraying device 9 that evaporates unneeded excess water, and sprays it so as to discharge it to the exterior. Further, the water-circulating toilet sewage treating machine 4a of the toilet system treating device 4 and the water-circulating domestic wastewater sewage treating machine 5a of the cooking system treating device 5 are connected to a device 10 for solids/liquids separation and removed matter solidification. Due to this device 10 for solids/liquids separation and removed matter solidification, solids such as inorganic matter, large organic matter, fibers and the like are separated from water, and these solids are converted into the form of concentrated water in which these solids are mixed together with a small amount of water, or into the form of solids that do not contain water due to the moisture being completely dehydrated therefrom, and can be treated at the exterior of the device.

Further, for the complete dehydration of water, various means such as centrifugal force, vacuum, heat, natural evaporation, wind, microwaving or the like can be selected appropriately in accordance with the amount of energy.

In the present embodiment, the sewage treating machines that correspond to the water qualities are used separately for the generating sources such as the toilet system, the cooking system, the laundry system, the shower system and the like, and therefore, there is no waste with regard to at least the treatment speed and the consumed energy. For example, comparing a wastewater that contains oil and a wastewater that does not contain oil, if it is assumed that the same impurities are contained in the waters, the former has two types of matter to be removed by the removal of the oil and the removal of the impurities, and the latter has one type of matter to be removed. Accordingly, by dividing the water-circulating sewage treating machines that are appropriate for the respective generating sources per generating source, the minimum required treatment processes can be realized.

Further, in the present embodiment, biological treatment water-circulating treating machines and mechanical water-circulating treating machines are used for different purposes in accordance with the generating source, and therefore, it is easy to manage the amount of organic matter that is needed for biological treatment. If all are made into a single treating machine, the sewage level will always fluctuate depending on the way in which water is used by the user, such as, in the case of showering, there is only sewage that contains surfactants, or the like. Therefore, it is difficult to manage the nutrients for the microbes that are needed in the biological treatment. For example, in treating wastewater that contains organic matter such as a toilet system, a cooking system or the like, it is important to provide water-circulating treating machines individually in correspondence with the generating sources. In the present embodiment, with respect to the water quality and the water amount of the water that is brought-in for water circulation, there is matter that is excreted and flows-out from the detergent, cooking additives, food and human bodies that are used, but other than this, the water that is used is not contaminated from the exterior.

Further, in the present embodiment, concentrated water, which contains organic matter and is generated in the process of a mechanical water circulating treatment such as a membrane treatment or the like, can be treated by using a microbial treatment by being exchanged between a treating machine that includes biological treatment water and a treating machine that does not include biological treatment water. By providing plural water-circulating treating machines that correspond to the contamination generating sources, the devices can be divided into devices that increase the amount of water that is circulated, and devices that decrease the amount of water that is circulated. By dividing the devices in this way, it is easy to understand the amount of increase and the amount of decrease, and circulation water that has increased can be stored as excess water, and supplied in the necessary amount to a device at which water has decreased.

In such a structure, in the respective devices 4 through 7 that are provided for the respective generating sources, the respective sewage treating machines 4a, 5a, 6a, 7a carry out treatments such as purifying the sewage that is generated or the like, and feed-out and store the treated waters in the circulation water usage tanks 4b, 5b, 6b, 7b.

In this process, the sensors 4c, 5c, 6c, 7c of the respective devices 4 through 7 always sense the amounts of water and water qualities (necessary items relating to water treatment such as, for example, turbidity, color, PH, salinity, amount of nitrogen, odor, amount of ammonia, impurities, taste components, matter to be removed, and the like) of the treated waters of the respective devices 4 through 7, and transmit sensor data to the control device 2. The control device 2 processes the sensor data, and judges whether the water qualities are less than reference values. Then, in a case in which there is a poor state such as the water quality of the treated water or the like is not less than the reference value, the control device 2 effects control so as to return that treated water to the treating machine 4a, 5a, 6a, 7a, and treat the water again. Or, in a case in which it is judged that treatment at another device, such as the device 10 for solids/liquids separation and removed matter solidification or the like, is effective, the control device 2 effects control so as to send the treated water there and treat the water.

In daily usage of water, the amount of the circulation water increases due to the toilet wastewater and the moisture that is brought-in by cooking and the like. On the other hand, when doing laundry or in the shower or the like, a decrease in moisture arises due to evaporation, or water sticking to the body, or the like. By managing the amount of water and the water quality of the treated water by the control device 2, a balance can be achieved between the increases and decreases in the amounts of water at the respective devices 4 through 7. Due thereto, a constant amount of water can be continued to be circulated, and, in cases in which the amount increases too much or the like, the water is stored in the excess water tank/storage tank 8, and in cases in which there is even more excess, the situation can be handled by spraying treatment and evaporating treatment by the moisture evaporating/spraying device 9 or the like.

Further, the water-circulating sewage treating machine 4a, 5a, 6a, 7a is provided from each generating source, and the control device 2 grasps, in real time, the total water amount of the respective devices 4 through 7. Therefore, life can be supported by the minimum amount of water needed, without relying on a lifeline. Further, in a case in which impurities, which are other than those brought-in as circulation water, are sensed by the sensor 4c, 5c, 6c, 7c, the control device 2 detects this, and can notify an external device (e.g., a terminal device or the like) of the abnormality. Therefore, it is easy to monitor the safety of the water that is used. Water is circulated and treatment can be continued by a loop that is complete within the water treatment system without connections from the exterior. Therefore, it is also easy to relocate and enlarge the present system.

Further, water can also be replenished directly between the respective devices 4 through 7 with one another, before being stored in the excess water tank/storage tank 8 as excess water. In this case, the needed water is exchanged between the devices 4 through 7, and, due to the control device 2 knowing the overall amount of water, the control device 2 can conveniently know the amount to be replenished and the time period for replenishment in a case in which the amount of water is insufficient, and amounts and time periods for discharging and storing in a case in which there is excess water.

The amounts, water qualities and treated states of the treated waters of the respective devices 4 through 7 can be detected by the sensors 4c, 5c, 6c, 7c, and the results of detection can be stored in the database 3, and, due to the control device 2 learning the data by machine learning by artificial intelligence (AI) or the like, maintenance time estimation, the amount of water that can be used, the amount of time over which usage is possible, the treatment completion time, insufficient equipment, limitations and the like can be accurately relayed to a user (including a third party or a manager) in advance or in real time.

Due to the control device 2 understanding the treatment capabilities of the treating machines 4a, 5a, 6a, 7a provided at the respective devices 4 through 7, and the amount of water needed for circulation, and the like, a combination that corresponds to the number of people using the system, the scale, the frequency and the like can be constructed freely, and exchange of water between the water treating machines can be controlled. Therefore, a water treatment system that corresponds to the scale can be realized. The system also can be made to correspond to only some equipment, for example, to only the toilet system or the like. In a case of application to only a toilet, based on the sensor data, the control device 2 grasps the situation with respect to the water quality such as the water is sterile but may have a slight amount of color, or the like, and, due to the control device 2 monitoring the treatment situation, the water can be treated appropriately and optimally. By understanding the treatment capabilities of the respective treating machines and the amount of water needed for circulation, a combination that corresponds to the number of people using the system, the scale, and the frequency can be constructed freely.

In addition, in accordance with the water treatment system relating to the present embodiment, the waters that are used in daily life can be segregated. In other words, it is possible to provide a life in places that are completely shut-off or in places for which isolation is desired.

Figures 2, 3:
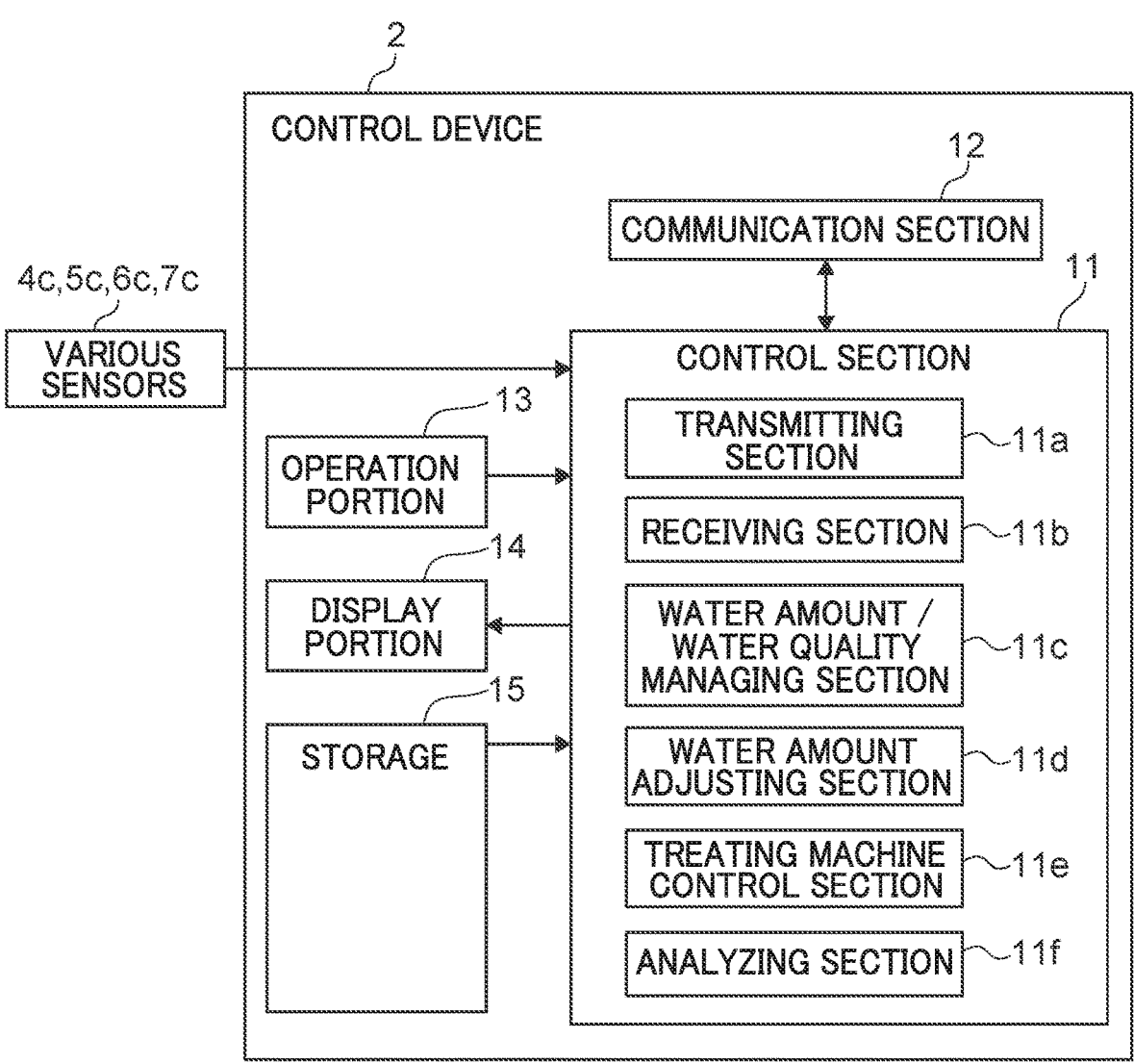
FIG. 2 is a structural drawing of a control device of the system.
FIG. 3 is a drawing illustrating an example of a managing table.

The structure of the control device at the water treatment system is illustrated and described in FIG. 2.

As shown in this drawing, the control device 2 has a control section 11 such as a CPU (Central Processing Unit) or an MPU (Micro Processing Unit) or the like that governs overall control. The control section 11 is connected to a communication section 12, an operation portion 13, a display portion 14, and a storage 15. Further, the control section 11 is connected to the various sensors 4c, 5c, 6c, 7c that are provided at the respective devices 4 through 7.

The communication section 12 is a communication interface for carrying out communication with external machines. For example, wireless or wired communication with the sewage treating machines 4a, 5a, 6a, 7a of the respective devices 4 through 7 is realized. The operation portion 13 is structured by a keyboard, a mouse, an operation switch, and the like. The display portion 14 is structured by a liquid crystal display or the like.

The storage 15 is realized by, for example, a semiconductor memory element such as a RAM (Random Access Memory) or a flash memory or the like, or a hard disk drive (HDD), or an optical disk device or the like. Programs that are executed at the control section 11 are stored in advance in the storage 15. Further, the storage 15 stores the water amounts and water qualities of the circulation water usage tanks 4b, 5b, 6b, 7b of the respective devices 4 through 7. As an example thereof, as illustrated in FIG. 3, at least the dates/times, water amounts, and water qualities that have been sensed are stored.

In this structure, due to the control section reading-out and executing a program of the storage 15, the control section 11 functions at least as a transmitting section 11a, a receiving section 11b, a water amount/water quality managing section 11c, a water amount adjusting section 11d, a treating machine control section 11e and an analyzing section 11f.

The transmitting section 11a sends-out driving control signals to the respective sewage treating machines 4a, 5a, 6a, 7a via the communication section 12, and transmits log data relating to sensing of the storage 15, alert data based on the results of analysis by the analyzing section 11f, and the like to external machines via the communication section 12. The receiving section 11b receives sensor data from the sensors 4c, 5c, 6c, 7c of the respective devices 4 through 7, and the like. Further, the receiving section 11b receives driving instructions from external machines. The water amount/water quality managing section 11c appropriately updates the sensor data of the storage 15, and manages the states of the water amounts and the water qualities of the respective devices 4 through 7.

On the basis of the sensor data, the water amount adjusting section 11d judges whether or not the water amounts and the water qualities of the respective devices 4 through 7 are appropriate, and adjusts the balance of the water amount of the water treatment system 1 overall by carrying out feeding of water between the respective devices 4 through 7, or from the excess water tank/storage tank 8 to the device 4 through 7 at which the amount of water is insufficient. The treating machine control section 11e controls the driving of the sewage treating machines 4a, 5a, 6a, 7a that are within the respective devices 4 through 7. The treating machine control section 11e can also carry out driving control that is based on driving instructions from an external machine. On the basis of the sensor data stored in the storage 15, the analyzing section 11f analyzes the timing for adjusting the water amount, the amount of water that is to be replenished and the like, by machine learning or the like for example, and carries out control that is based on the results of analysis, and thereby realizes a suitable circulation loop.

Treatment processes relating to water amount adjustment by the water treatment system relating to the first embodiment of the present disclosure are described in detail hereinafter with reference to the flowchart of FIG. 4.

When the receiving section 11b acquires sensor data from the sensors 4c, 5c, 6c, 7c (S1), the water amount/water quality managing section 11c updates the sensor data stored in the storage 15 (S2). In the storage 15, the dates/times at which the sensor data were acquired and the water amounts and water qualities are stored in time series and in correspondence with one another in the form of a table such as illustrated in previous FIG. 3.

At the time when the sensor data is acquired, or at a predetermined time, the water amount adjusting section 11d judges whether or not an insufficiency in the amount of water has arisen in the waters used in the circulation/usage water tanks 4b, 5b, 6b, 7b of the devices 4 through 7 (S3). If no insufficiency has arisen in particular, the routine returns to step S1, and the above-described processings are repeated.

On the other hand, in a case in which there is a device 4 through 7 at which an insufficiency in the water amount has arisen, the water amount adjusting section 11d judges whether or not replenishment is possible by usage water of a circulation water usage tank of another device (S4). Then, if it is judged that replenishment from another device is possible, the water amount adjusting section 11d effects control such that the usage water of the device 4 through 7 at which the water amount is insufficient is replenished by usage water of the circulation/usage water tank 4a, 5a, 6a, 7a of the device 4 through 7 that can replenish water (S5).

In contrast, in a case in which it is judged that the insufficient water amount cannot be replenished by water of the circulation/usage water tank of another device, the usage water of the device 4 through 7 at which the water amount is insufficient is replenished by water of the excess water tank/storage tank 8 (S6). Then, the routine returns to step S1 again, and, by repeating the above-described processings, a circulation loop that is complete within the water treatment system 1 is realized.

Figures 4, 5:
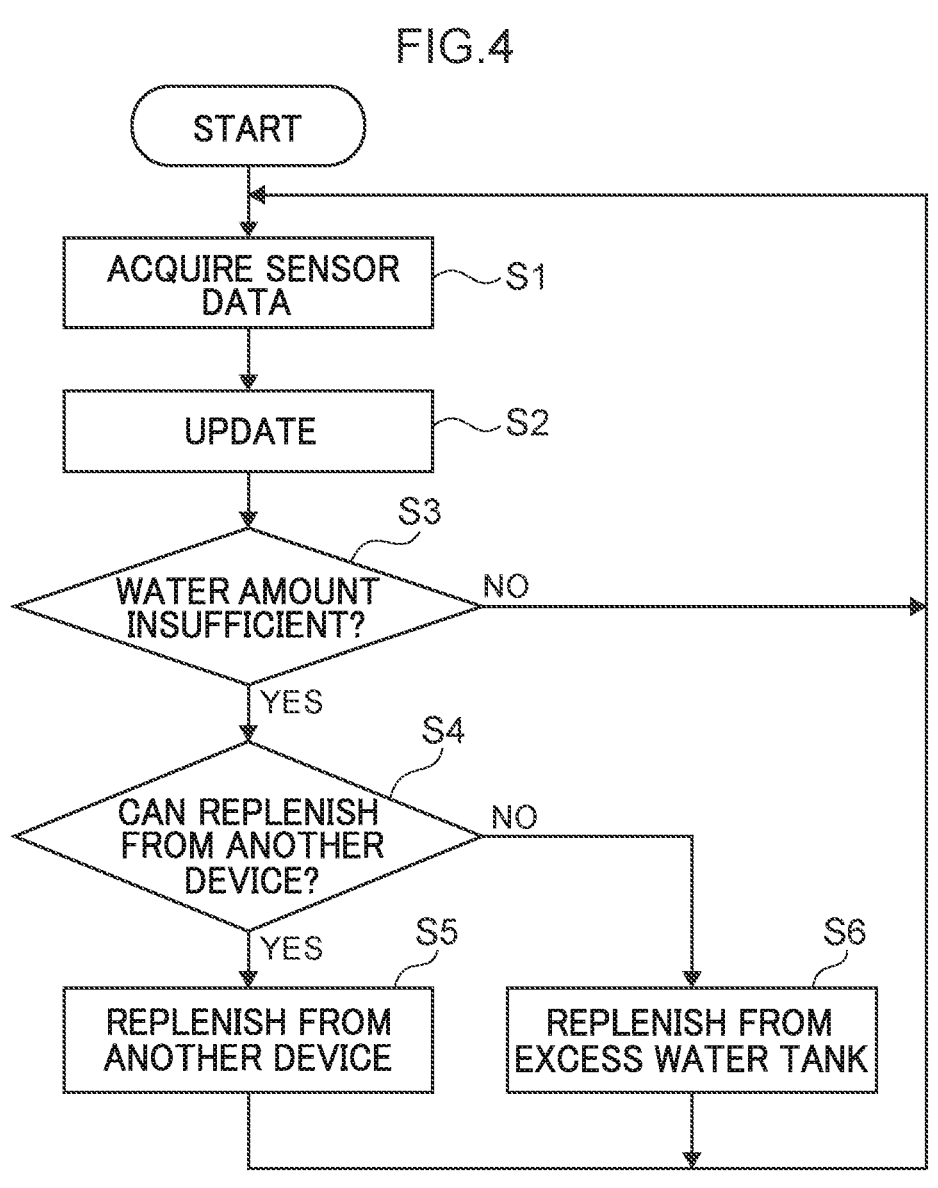
FIG. 4 is a flowchart that explains details of treatment processes relating to water amount adjustment by the water treatment system relating to the first embodiment of the present disclosure.
FIG. 5 is a drawing illustrating an example of a table that defines the priority order for determining the supply source.
Figure 7:
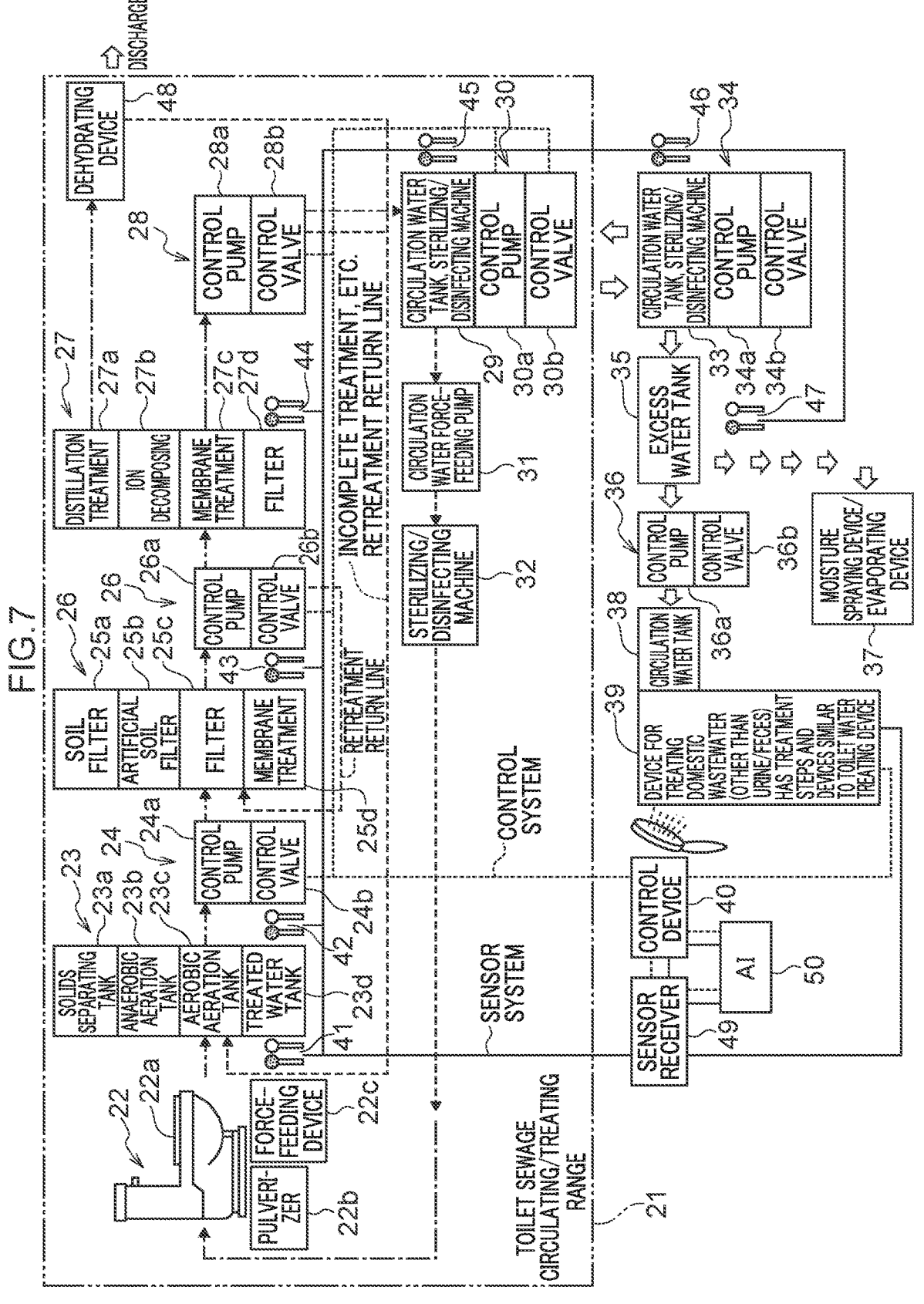
FIG. 7 is a structural drawing of a water treatment system relating to a second embodiment of the present disclosure.

Note that, in step S4, at the time of judging whether or not the insufficient water amount can be replenished by water of the circulation/usage water tank of another device, in a case in which devices that are to be prioritized as replenishing sources are set per time period as illustrated in FIG. 5, the replenishing source may be selected in accordance with the priority order. The priority order of FIG. 5 may be optimized while constructing big data in which data are accumulated, by machine learning by the analyzing section 11*f*.

Generally, at the toilet system treating device 4, the water amount increases due to toilet wastewater, and, at the cooking system treating device 5, the water amount of the circulation water increases due to the moisture that is brought-in by cooking or the like. On the other hand, at the laundry system treating device 6 and the shower system treating device 7, a decrease in moisture arises due to evaporation and water sticking to the body and the like. By managing the water amounts and the water qualities of the treated waters by the control device 2 as described above, a balance in the increases and decreases of the amounts of water can be achieved among the respective devices 4 through 7.

Moreover, if the results of analysis by machine learning of the analyzing section 11*f* are referenced at the time of water amount adjustment, the control device 2 can, while grasping the overall water amount, predict in advance the replenished amount of the usage water and the replenishing time period in cases in which an insufficiency arises, and the amounts and time periods and the like of discharging and storing at times when there is excess.

Next, treatment processes relating to another form of water amount adjustment by the water treatment system relating to the first embodiment of the present disclosure are described in detail with reference to the flowchart of FIG. 6.

When the receiving section 11*b* acquires sensor data from the sensors 4*c*, 5*c*, 6*c*, 7*c* (S11), the water amount/water quality managing section 11*c* updates the sensor data stored in the storage 15 (S12). In the storage 15, the dates/times at which the sensor data were acquired and the water amounts and water qualities are stored in time series and in correspondence with one another in the form of a table such as illustrated in previous FIG. 3.

At the time when the sensor data is acquired, or at a predetermined time, the water amount adjusting section 11*d* judges whether or not the amounts of the usage waters of the circulation/usage water tanks 4*b*, 5*b*, 6*b*, 7*b* of the devices 4 through 7 are less than reference values (S13). What is called reference value here is a value that, if the water amount becomes less than that, it is predicted that replenishment from another device or from the excess water tank will be necessary, and is set in advance per device. If the water amounts are greater than or equal to the reference values, the routine returns to step S11, and the above-described processings are repeated.

On the other hand, in a case in which a water amount is less than the reference value, the treating machine control section 11*e* transmits a control signal for raising the treatment speed of the sewage treating machine of the device at which the water amount has become less than the reference value, and thereby controls the driving of the sewage treating machine (S14). When the sewage treating machine receives this control signal, the sewage treating machine improves the treatment speed, and therefore, the circulation/usage water that is insufficient can be replenished at a speed that is faster than usual. In accordance with the above-described processings, by predicting a situation in which an insufficiency in the water amount will arise, and temporarily improving the treatment speed of the sewage treating device, countermeasures to an insufficiency in the water amount can be taken by the device itself.

The processings of above-described FIG. 4 and the processings of FIG. 6 may, of course, be used in combination.

Second Embodiment

The structure of a water treatment system relating to a second embodiment of the present disclosure is illustrated and described in FIG. 7.

As shown in this drawing, at unit 22, sewage (hereinafter called "raw water") that contains contaminants, paper and the like is generated by a toilet 22*a*. The solids that are contained in the raw water are pulverized finely by a pulverizer 22*b* or the like, and are fed under pressure via sensor 41 to unit 23 by a force-feeding pump 22*c*. The sensor 41 always senses the water quality, temperature, intermixed fungi, and water amount of the water that is sent to the unit 23, and transmits the sensor data to a control device 40.

The unit 23 is formed from a solids separating tank 23*a*, an anaerobic aeration tank 23*b*, an aerobic aeration tank 23*c* and a treated water tank 23*d*, and carries out pre-treatment of the raw water, separating treatment of the organic matter, inorganic matter, fungi, ammonia, nitrogen, fibers and the like that are contained in the solids and the fibers and in the excrement included in the raw water, and decomposing treatment. The treated water after the treatments is stored in the treated water tank 23*d*.

A sensor 42 senses the pre-treatment situation and the amount of water of the unit 23, and transmits the sensor data to the control device 40. At the point in time when the color, turbidity, PH, oxygen concentration in the raw water, BOD, Do, nitrogen amount, odor, temperature, number of fungi reaches a given standard, or at the point in time when the water amount within the tank becomes full, the control device 40 controls a control pump 24*a* and a control valve 24*b* of a unit 24, and sends raw water, for which pretreatment has been completed, to unit 25. The sensor data of the sensor 42 expresses the state of the raw water before being sent to the next unit 25.

The unit 25 is formed from a soil filter 25*a*, an artificial soil filter 25*b*, a filter 25*c*, a membrane treatment section 25*d* and the like, and treats the raw water, on which the pretreatment was carried out at the unit 23, to an even higher degree. More specifically, the unit 25 carries out soil filtering treatment, ultraviolet treatment, membrane treatment, filtering treatment, and the like. However, the contents of the treatments are not limited to this.

A sensor 43 carries out, within the unit 25, grasping of the treated state, for example, in the case of a soil treatment, the monitoring of the state of the soil and activation of microorganisms, and the managing of a temperature appropriate for microbial survival, and the monitoring of clogs at filters, and the sensing of the operating states and breakdowns of respective devices, and transmits the sensor data to the control device 40. Due to the sensor 43 sensing the quality of the water that was treated at the unit 25, in a case in which treatment is incomplete, the water is sent into the unit 25 again by a control pump 26*a* and a control valve 26*b* of a unit 26, and can be treated again.

Due to the control device 40 comparing the state of the water quality at the sensor 42 and the sensor 43, the control device 40 can sense whether the matter for which removal from the raw water is desired has been removed appropriately. In a case in which the numerical values of the both are the same, it can be sensed that there is a problem with the unit that is interposed between the sensors.

Unit 27 is formed from a distillation treatment section 27*a*, an ion decomposing section 27*b*, a membrane treatment section 27*c*, a filter 27*d* and the like, and is a unit that carries out treatment of matter that could not be treated at the unit 25, or treatment of an even higher degree. Although similar to the unit 25, at the unit 27, the treated water, in which is mixed-in concentrated removed matter that was generated at the time of carrying out treatment to a high degree, is divided into solids and water at a dehydrating device 48. The generated water can be returned to the unit 23. There are no limits on the number of times of treatment at the units 25, 27, or on the number of times that the treated water, which is concentrated at that time, is returned to the unit of the prior stage. The water, which contains concentrated organic matter generated by the membrane treatments and the like of the units 25, 27, is returned to the unit 23 by a control pump 28a and a control valve 28b of a unit 28, and can thereby be treated again and decomposed.

At a sensor 44, the water quality of the treated water of the unit 27 is sensed, and treated water that satisfies the reference values is sent to a circulation water tank 29 by the control pump 28a and the control valve 28b of the unit 28. Because a sterilizing/disinfecting machine is incorporated in or is annexed to the circulation water tank 29, a deterioration in the water quality within the tank can be prevented. A sensor 45 detects the water quality within the circulation water tank 29, and transmits the sensor data to the control device 40. On the basis of this sensor data, the control device 40 observes and manages the water quality within the tank.

Due to operation of a control pump 30a and a control valve 30b of a unit 30, water stored in the circulation water tank 29 is sent, via a circulation water force-feeding pump 31, to a sterilizing/disinfecting machine 32, and, via the sterilizing/disinfecting machine 32, is returned to the unit 22. Due thereto, a constant amount of water is circulated, and sewage can be treated and the toilet can be continued to be cleaned by a constant amount of water. All of the structures described up to here are the mechanism of a circulation-type toilet device 21.

Moreover, at the circulation-type toilet device 21, moisture that has been excreted from human bodies is added, and the amount of water that is circulated increases as excess water. In contrast, at a water treating device 39 of a shower or domestic wastewater or the like, the amount of water tends to decrease due to evaporation and sticking to a body and the like at the time of use. In a cooking system, depending on the case, there may be cases in which the amount of water increases, but there are many factors that reduce the amount of water.

The water treatment system relating to the present embodiment focuses on the above-described point, and provides, per sewage generating source, a water circulation/treating device, which corresponds to the object of the treatment, separately from the toilet sewage circulating/treating device. By connecting these, insufficient moisture can be replenished at other than the toilet sewage circulating/treating device.

The amount of the water that is treated at the circulation-type toilet device 21, and the amount of water that is circulated within the circulating/treating range, are sensed by the sensor 45, and the excess water is sent as excess water to an excess water tank 35 by operation of the control pump 30a and the control valve 30b of the unit 30. Because a sterilizing/disinfecting machine is incorporated in or is annexed to this excess water tank 35, a deterioration in the water quality within the tank can be prevented.

A sensor 47 senses the amount of water and the water quality of the water stored in the excess water tank 35, and transmits the sensor data to the control device 40. On the basis of the sensor data from the sensors 45, 46, the control device 40 grasps the amount of water within the circulation-type toilet device 21 and the amount of water within the excess water tank 35, and, by carrying out taking-out and filling-in of water at the both, can also address a decrease in the amount of water of the circulation-type toilet device 21 due to evaporation or the like. The control device 40 sends the water that is even further excess to the excess water tank 35 by a control pump 34a and a control valve 34b of a unit 34. Because a sterilizing/disinfecting machine is incorporated in or is annexed to the excess water tank 35, a deterioration in the water quality within the tank can be prevented.

The sensor 47 senses the quality and the amount of the water that is stored in the excess water tank 35, and transmits the sensor data to the control device 40. The control device 40 controls the driving of a control pump 36a and a control valve 36b of a unit 36, and supplies the insufficient amount of water to a circulation water tank 38 of the unit 39 that is another water circulating/treating device.

Moreover, in a case in which there is excess moisture in the water treatment system overall, or the like, treatment and disposition by dispersion, spraying, evaporation or the like are carried out at a unit 37.

In this way, in the water treatment system relating to the present embodiment, based on sensor data from the respective sensors 41 through 47 via a sensor receiver 49, the control device 40 monitors the amounts and the water qualities of the treated waters that are in the process of circulating, and of the treated waters that are stored in the treated water tank 23d, the circulation water tank 29, a circulation water tank 33, the excess water tank 35 and the circulation water tank 38. Accordingly, in a case in which an insufficiency in the water amount arises at the treated water tank 23d or the circulation water tank 38, supplying of treated water from a water tank of an ample water amount to the water tank at which the insufficiency has arisen is carried out under the control of the control device 40. Therefore, the water treatment system on the whole forms a circulation loop at which there are no shortages or overages, and, without relying on other water sources, can provide water that is needed for various applications such as a toilet system or a cooking system and the like.

Moreover, the results of detecting the water amounts, water qualities and treated states of the treated waters of the toilet system treating device and the other treating devices and the like are accumulated in the database, and, due to an AI unit 50 learning this data by machine learning or the like, the user (including a third party or a manager) can be accurately informed, whether in advance or in real time, of maintenance time estimation, the amount of water that can be used, the time over which usage is possible, the treatment completion time, insufficient equipment, limitations, and the like.

Third Embodiment

Figure 8:
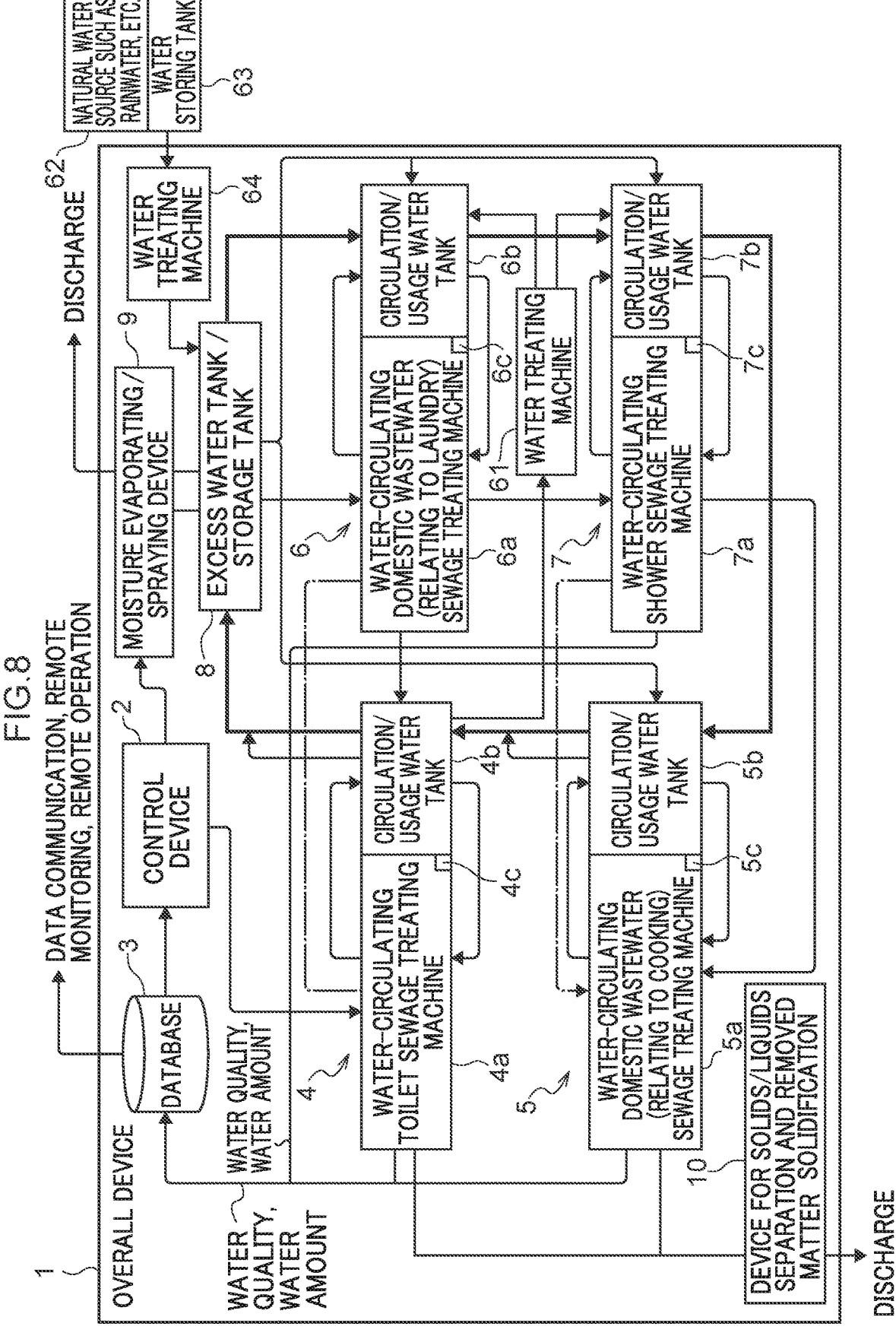
FIG. 8 is a structural drawing of a water treatment system relating to a third embodiment of the present disclosure.

The structure of a water treatment system relating to a third embodiment of the present disclosure is illustrated and described in FIG. 8. Here, structures that are the same as FIG. 1 are denoted by the same reference numerals, and repeat description is omitted, and description proceeds while focusing on the portions that differ.

As shown in this figure, the water treatment system relating to the third embodiment has an integrated water treating machine 61. In the water treatment system relating to the first embodiment, even in a case in which the circulation/usage waters that are treated at the respective devices 4 through 7 are used at any of the devices 4 through 7, it is guaranteed that the waters are of good water quality that exceeds a reference value. However, for example, in a case in which the reference values of water qualities that are needed for circulation in the respective devices 4 through 7 are set individually, if replenishing of treated water is carried out between respective devices, the water quality must be made to match the water quality of the destination of replenishment. From this standpoint, the integrated water treating machine 61 is provided separately in the present water treatment system.

The toilet system treating device 4 and the cooking system treating device 5 are devices at which it is easy for excess water to arise. The laundry system treating device 6 and the shower system treating device 7 are devices at which it is easy for moisture to become insufficient. Accordingly, a situation in which water is replenished from the toilet system treating device 4 or the cooking system treating device 5 to the laundry system treating device 6 or the shower system treating device 7 can be supposed. Because the cooking system treating device 5 requires the highest water quality level, the water of the circulation/usage water tank 5b of the cooking system treating device 5 can be replenished as is to the laundry system treating device 6 and the shower system treating device 7. On the other hand, there are cases in which the water quality of the water that is stored in the circulation/usage water tank 4b of the toilet system treating device 4 is lower than the quality levels of the circulation waters that are used in the laundry system treating device 6 and the shower system treating device 7. Thus, at the time of replenishing water from the toilet system treating device 4 to the laundry system treating device 6 or the shower system treating device 7, at the integrated water treating machine 61, the water of the circulation/usage water tank 4b of the toilet system treating device 4 is re-treated up until the level that is required of the circulation/usage waters of the respective devices 6, 7, and is supplied thereto.

The driving of the integrated water treating machine 61 also is controlled by the control device 2. For example, the interior of the integrated water treating machine 61 may be divided into two systems, and different treatment systems may be used in a case in which water is replenished to the laundry system treating device 6 and in a case in which water is replenished to the shower system treating device 7. In this case, the control device 2 controls the switching between the treatment systems.

Other than the above, the water treatment system relating to the third embodiment of the present disclosure has a natural resource storing water tank 63 that stores a natural resource 62 such as rainwater or the like, and a natural resource water treating machine 64. The water of the natural resource storing water tank 63 is treated at a natural resource water treating machine 64d, and a structure that stores the treated water in the excess water tank 8 is also provided. The natural resource water treating machine 64d also carries out treatments for maintaining the water quality of the storing water tank 63. Accordingly, also in the above-described case, natural resources can be utilized effectively, and a water circulation loop can be constructed.

As described above, the following effects are obtained in accordance with embodiments of the present disclosure.

(1) In accordance with an embodiment of the present disclosure, there is provided the water treatment system 1 that treats sewage from each generating source of generating sources that include at least any of a toilet system, a cooking system, a laundry system or a shower system, and stores the treated waters as circulation/usage waters, the water treatment system 1 including: the plural sewage treating machines 4a, 5a, 6a, 7a provided for the generating sources, respectively; the plural sensors 4c, 5c, 6c, 7c that are provided for the generating sources respectively, and that at least detect and output water amounts and water qualities of treated waters of the sewage treating machines; the tanks 4b, 5b, 6b, 7b that are provided for the generating sources respectively, and that store treated waters as circulation/usage waters; the excess water tank/storage tank 8 that stores excess water generated at the tanks; and the control device 2 that controls the driving of the sewage treating machines, and that, based on sensor data from the sensors, manages water amounts and water qualities of the treated waters of the tanks of the respective generating sources, wherein, in a case in which the control device judges, based on sensor data, that insufficiency in the circulation/usage water of one of the generating sources has arisen, the control device effects control so as to replenish an insufficient amount by circulation/usage water of another generating source or excess water of the excess water tank. Accordingly, basically without relying on the supply of water from an external water source, the respective attributes of the generating sources can be utilized well as a system on the whole, and a circulation loop of usage water can be constructed.

(2) In the water treatment system of above-described (1), the circulation/usage waters become excessive at the toilet system and the cooking system, and the circulation/usage waters decrease at the laundry system and the shower system, and, in a case in which an insufficiency in the circulation/usage water arises at the laundry system or the shower system, if there is excess circulation/usage water at the toilet system or the cooking system, the control device 2 may effect control so as to replenish the insufficient amount of water to the tank 6b, 7b of the laundry system or the shower system from the tank 4b, 5b of the toilet system or the cooking system. Accordingly, excess water can be used without waste at the system on the whole, while taking the attributes of the respective generating sources into account.

(3) The water treatment system of above-described (1) or (2) may further include the integrated water treating machine 61, and, in a case in which the insufficient amount of water is replenished to the tank 6b, 7b of the laundry system or the shower system from the tank 4b of the toilet system, water from the tank of the toilet system may be treated by the integrated water treating machine so as to become a water quality that matches a reference value of the destination of replenishment, and thereafter, may be replenished thereto. Accordingly, even in a case in which the exchange of water is carried out between devices, after water is purified up to the water quality level that is required at the destination of the supply, the water can be supplied, and therefore, the circulation loop within the system is more smooth.

(4) The water treatment system of above-described (1) through (4) may have the natural resource storing water tank 63 that stores water from the natural resource 62, and the natural resource water treating machine 64 that treats the water of the natural resource storing water tank, and water treated by the natural resource water treating machine may be sent to the excess water tank 8. Accordingly, water obtained from a natural resource also can be utilized as part of the circulation loop of the system.

(5) In the water treatment system of above-described (1) through (4), when the control device 2 judges, based on sensor data, that at least either of the water amount and the water quality of treated water is abnormal in relation to a reference value, the control device 2 may transmit predetermined warning data to an external terminal device, and receive a driving instruction from the external terminal device. Accordingly, from an external device at a remote location, the situation of the circulating of usage water at the water treatment system 1 and the like can always be confirmed, and moreover, instructions for driving can be given.

(6) On the other hand, in accordance with an embodiment of the present disclosure, there is provided a water treatment method that treats sewage from each generating source of generating sources which include at least any of a toilet system, a cooking system, a laundry system or a shower system, and stores the treated waters as circulation/usage waters, wherein: the sewage treating machines 4a, 5a, 6a, 7a treat sewage from each generating source; the sensors 4c, 5c, 6c, 7c at least detect and output water amounts and water qualities of treated waters of the sewage treating machines; the tanks 4b, 5b, 6b, 7b store the treated waters as circulation/usage waters; the excess water tank/storage tank 8 stores excess water generated at the tanks; and the control device 2 controls the driving of the sewage treating machines, and, based on sensor data from the sensors, manages water amounts and water qualities of the treated waters of the tanks of the respective generating sources, and, in a case of judging, based on sensor data, that insufficiency in the circulation/usage water of one of the generating sources has arisen, replenishes an insufficient amount by circulation/usage water of another generating source or excess water of the excess water tank. Accordingly, basically without relying on the supply of water from an external water source, the respective attributes of the generating sources can be utilized well as a system on the whole, and a circulation loop of usage water can be constructed.

(7) In the water treatment method of above-described (6), the circulation/usage waters become excessive at the toilet system and the cooking system, and the circulation/usage waters decrease at the laundry system and the shower system, and, in a case in which an insufficiency in the circulation/usage water arises at the laundry system or the shower system, if there is excess circulation/usage water at the toilet system or the cooking system, the control device 2 may replenish the insufficient amount of water to the tank 6b, 7b of the laundry system or the shower system from the tank 4b, 5b of the toilet system or the cooking system. Accordingly, excess water can be used without waste at the system on the whole, while taking the attributes of the respective generating sources into account.

(8) In the water treatment method of above-described (6) or (7), in a case in which the insufficient amount of water is replenished to the tank 6b, 7b of the laundry system or the shower system from the tank 4b of the toilet system, the integrated water treating machine 61 may treat water from the tank of the toilet system so as to become a water quality that matches a reference value of the destination of replenishment, and thereafter, may replenish the water. Accordingly, even in a case in which the exchange of water is carried out between devices, after water is purified up to the water quality level that is required at the destination of the supply, the water can be supplied, and therefore, the circulation loop within the system is more smooth.

(9) In the water treatment method of above-described (6) through (8), the natural resource storing water tank 63 may store water from the natural resource 62, and the natural resource water treating machine 64 may treat the water of the natural resource storing water tank 63, and water treated by the natural resource water treating machine may be sent to the excess water tank 8. Accordingly, water obtained from a natural resource also can be utilized as part of the circulation loop of the system.

(10) In the water treatment method of above-described (6) through (9), when the control device 2 judges, based on sensor data, that at least either of the water amount and the water quality of treated water is abnormal in relation to a reference value, the control device 2 may transmit predetermined warning data to an external terminal device, and receive a driving instruction from the external terminal device. Accordingly, from an external device at a remote location, the situation of the circulating of usage water at the water treatment system 1 and the like can always be confirmed, and moreover, instructions for driving can be given.

Although embodiments of the present disclosure have been described above, the present disclosure is not limited to these, and, of course, various improvements/modifications are possible within a scope that does not depart from the gist thereof.

For example, the supply of energy from the exterior can be made unnecessary by installing a natural energy power generating system and batteries. Moreover, in a case in which the water source comes from nature, by passing the water through a (rain-/river-/pond-/sea-) water circulating/treating device, treated water of a water quality of a given standard can be obtained, and therefore, depending on the place or conditions, transporting of water may not be necessary.

EXPLANATION OF REFERENCE NUMERALS

1 . . . water treatment system, 2 . . . control device, 3 . . . database, 4 . . . toilet system treating device, 4a . . . water-circulating toilet sewage treating machine, 4b . . . circulation/usage water tank, 5 . . . cooking system treating device, 5a . . . water-circulating domestic wastewater sewage treating machine, 5b . . . circulation/usage water tank, 6 . . . laundry system treating device, 6a . . . water-circulating domestic wastewater sewage treating machine, 6b . . . circulation/usage water tank, 7 . . . shower system treating device, 7a . . . water-circulating shower sewage treating machine, 7b . . . circulation/usage water tank, 8 . . . excess water tank/storage tank, 9 . . . moisture evaporating/spraying device, 10 . . . device for solids/liquids separation and removed matter solidification, 11 . . . control section, 11a . . . transmitting section, 11b . . . receiving section, 11c . . . water amount/water quality managing section, 11d . . . water amount adjusting section, 11e . . . treating machine control section, 11f . . . analyzing section, 12 . . . communication section, 13 . . . operation portion, 14 . . . display portion, 15 . . . storage.

The invention claimed is:

1. A water treatment system that treats sewage from each generating source of generating sources and stores treated waters as circulation/usage waters, wherein the generating sources include at least two of a toilet system, a cooking system, a laundry system and a shower system, the system comprising:

a plurality of first devices provided for the generating sources respectively, wherein the plurality of first devices include a membrane, or a filter;

one or more sensors that are provided for the generating sources respectively, wherein the one or more sensors includes at least one of: a water amount sensor configured to detect and output water amounts of treated waters of the first devices, and a water quality sensor configured to detect and output water qualities of treated waters of the first devices;

a plurality of tanks that are directly connected to the plurality first devices provided for the generating sources respectively, and that store the treated waters as circulation/usage waters;

an excess water tank that is connected to each of the plurality of tanks and stores excess water generated at the tanks, wherein the excess water tank is fluidly connected to the generating sources via the respective tanks; and a control device that controls driving of the first devices, and that, based on sensor data from the sensors, manages water amounts and water qualities of the treated waters of the tanks of the respective generating sources, wherein, responsive to the control device judges, based on the sensor data, that insufficiency in a circulation/usage water of one of the generating sources has arisen, the control device effects control so as to replenish an insufficient amount by circulation/usage water of another generating source or excess water of the excess water tank.

2. The water treatment system of claim 1, wherein:

the circulation/usage waters become excessive at the toilet system and the cooking system, and the circulation/usage waters decrease at the laundry system and the shower system, and responsive to an insufficiency in the circulation/usage water arises at the laundry system or the shower system, responsive to there is excess circulation/usage water at the toilet system or the cooking system, the control device effects control so as to replenish the insufficient amount of water to a tank of the laundry system or the shower system from a tank of the toilet system or the cooking system.

3. The water treatment system of claim 1, comprising:

a natural resource storing water tank that stores water from a natural resource.

4. The water treatment system of claim 1, wherein, when the control device judges, based on the sensor data, that one or more of the water amount or the water quality of the treated water is less than a reference value, the control device is configured to transmit predetermined warning data to an external terminal device, and receive a driving instruction from the external terminal device.

5. The water treatment system of claim 2, comprising:

a natural resource storing water tank that stores water from a natural resource.

6. The water treatment system of claim 2, wherein, when the control device judges, based on the sensor data, that one or more of the water amount or the water quality of the treated water is less than a reference value, the control device is configured to transmit predetermined warning data to an external terminal device, and receive a driving instruction from the external terminal device.

7. The water treatment system of claim 1, wherein, responsive to the control device judges, based on the sensor data, that insufficiency in a circulation/usage water of a first generating source has arisen, determine whether a replenishment from tanks directly connected to generating sources other than the first generating source is available, responsive to determining the replenishment is available, the control device effects control to replenish the insufficiency using the circulation/sewage water from the tanks directly connected to generating sources other than the first generating source, and responsive to determining the replenishment is unavailable, the control device effects control to replenish the insufficiency using water from the excess water tank.

* * * * *